United States Patent [19]

Nakamura

[11] Patent Number: 5,498,933
[45] Date of Patent: Mar. 12, 1996

[54] LIGHTING DEVICE AND METHOD APPLYING A RELATIVELY HIGHER POTENTIAL TO LIGHT SOURCE SURROUNDINGS

[75] Inventor: Kenji Nakamura, Hyogo, Japan

[73] Assignee: Mitsubishi Denki Kabushiki Kaisha, Tokyo, Japan

[21] Appl. No.: 483,837

[22] Filed: Jun. 15, 1995

Related U.S. Application Data

[63] Continuation of Ser. No. 176,227, Jan. 3, 1994, abandoned.

[30] Foreign Application Priority Data

Jan. 5, 1993 [JP] Japan ................. 5-015932

[51] Int. Cl.$^6$ ............................ H05B 41/14; B60Q 1/02
[52] U.S. Cl. ..................... 315/205; 315/8; 315/DIG. 7
[58] Field of Search .................. 315/205, 209 R, 315/307, 226, DIG. 7, DIG. 5, 85, 82, 344, 291, 200 R

[56] References Cited

U.S. PATENT DOCUMENTS 5,189,342  2/1993  Nilssen ........................... 315/226

FOREIGN PATENT DOCUMENTS

38299  1/1991  Japan .

*Primary Examiner*—Ali Neyzari
*Attorney, Agent, or Firm*—Birch, Stewart, Kolasch & Birch

[57] ABSTRACT

In a preferred embodiment, a lighting device may include a metal halide lamp and a polarity inversion step-up circuit which generates a DC voltage Va of minus value. An inverter circuit inverts the output of the polarity inversion step-up circuit to create AC voltage and supplies it to a discharge lamp. Consequently, the discharge lamp has applied a square wave AC voltage with voltage between zero and peak being nearly |Va|. Potential of a lighting tool to enclose the discharge lamp is set to ground potential. Since the discharge lamp is lit always at a mean lighting potential which is less than the potential of the lighting tool, the Na loss phenomenon is suppressed. That is, life of the discharge lamp can be lengthened. Other embodiments also operate to keep the mean lighting potential of the discharge lamp less than the potential of the lighting tool.

24 Claims, 9 Drawing Sheets

LIGHTING DEVICE AND METHOD APPLYING A RELATIVELY HIGHER POTENTIAL TO LIGHT SOURCE SURROUNDINGS

This application is a continuation of application Ser. No. 08/176,227 filed on Jan. 3, 1994, now abandoned.

BACKGROUND OF THE INVENTION

1. Field of the Invention

The present invention relates to a lighting device of a metal halide lamp noticed as a new light source for a vehicle, and more particularly relates to a lighting device of a discharge lamp which lengthens the life of a metal halide lamp.

2. Description of the Prior Art

In the field of automobiles, individuality, safety or environmental adaptation is strongly demanded. In order to meet such demand, pursuit of design of a car body in highly individual style and pursuit of improvement of traveling safety are being carried out. For example, with respect to a headlight, in place of an incandescent lamp as usual, adoption of a tungsten is becoming popular. Further, in order to improve the light quality of a headlight, and at the same time in order to meet demand with respect to style, adoption of a metal halide lamp is being studied.

A metal halide lamp is a sort of a high intensity lamp (HID). Among various artificial light sources, since the metal halide lamp is close to the sunlight (good in color rendering) in comparison with any other lamps and moreover can generate electric energy to be consumed as light efficiently (good in the light source efficiency), it is called the ultimate lamp.

Figure 1:
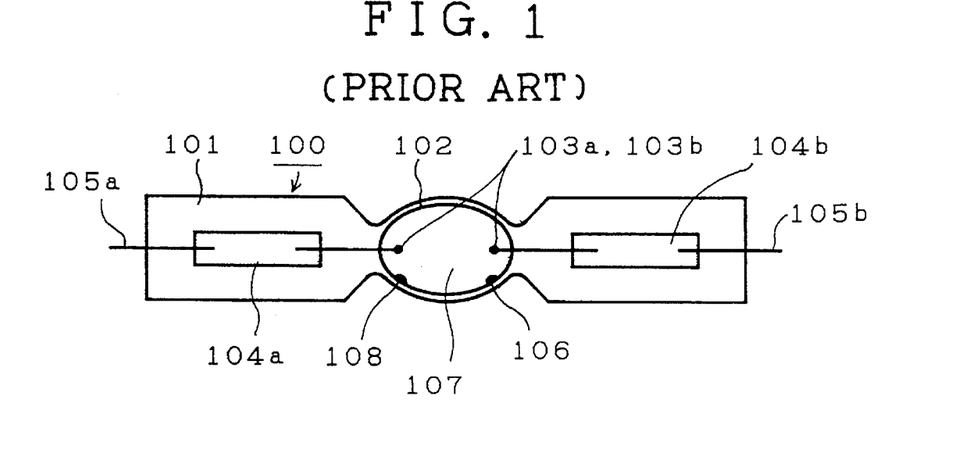
FIG. 1 is a schematic diagram showing structure of a metal halide lamp.

FIG. 1 is a schematic diagram showing structure of a metal halide lamp. The metal halide lamp 100 has a quartz tube 101 sealed at both ends, and a light emitting tube 102 enclosed at the center of the quartz tube 101. The light emitting tube 102 is provided with tungsten electrodes 103a, 103b, which are connected through molybdenum leaves 104a, 104b to external leads 105a, 105b. Metal iodide 106 made of several sorts of metals such as sodium, scandium reacting with iodine, starting gas (e.g., xenon) 107 and mercury 108 are filled into the light emitting tube.

Light emission of the metal halide lamp is carried out as follows. First, starting discharge occurs by the starting gas 107. Next, when the inside of the light emitting tube becomes high temperature and high pressure, generation of arc due to the starting gas 107 occurs. The metal iodide having been evaporation and in gaseous form, enters the arc, and is then separated into metal ions and halogen ions. That is, a state occurs where current is transmitted. Soon the temperature at the center portion of the arc attains to about 4,500 K., and the metal ions emit light strongly within the arc. At the same time, of locations where arc is not generated, metal and halogen are recombined into metal iodide 106. The ionization and the recombination are repeated as above described, thereby the strong light having inherent spectrum of the metal atom is continued to be emitted. Such a lighting device for a vehicle using a metal halide lamp is disclosed, for example, in JPA No. 8299/1991.

Figure 2:
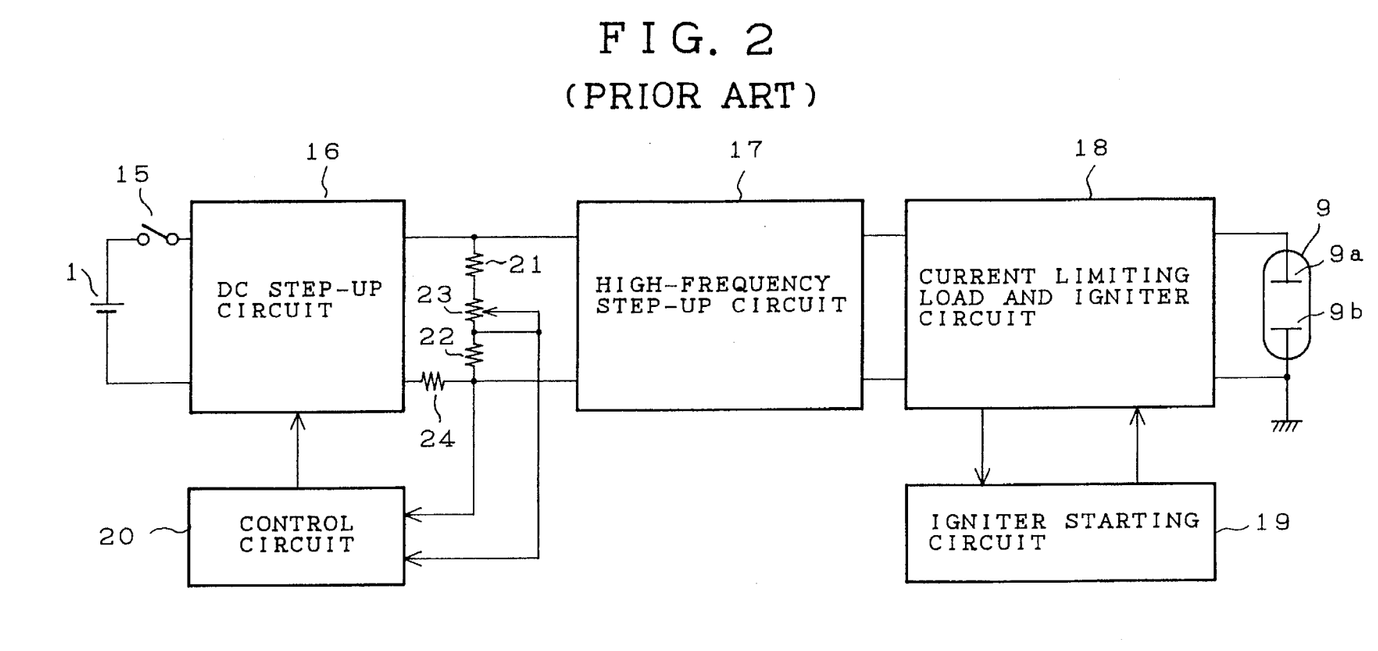
FIG. 2 is a block diagram of a conventional lighting device of discharge lamp.

FIG. 2 is a block diagram showing an example of a lighting device of a high voltage discharge lamp for a vehicle in the prior art. In FIG. 2, numeral 1 designates a battery, numeral 16 designates a DC step-up circuit with an input terminal connected through a lighting switch 15 to the power source terminal of the battery 1, and numeral 17 designates a high-frequency step-up circuit provided at the output side of the DC step-up circuit 16 for converting the battery voltage into sine wave AC voltage. For example, an inverter circuit in pushpull system is used as the high-frequency step-up circuit 17. Numeral 18 designates a current limiting load and igniter circuit, and a discharge lamp 9 is connected to the output end of the circuit 18.

Numeral 19 designates an igniter starting circuit for sending starting signals to the current limiting load and igniter circuit 18, and numeral 20 designates a control circuit. Numerals 21, 22 designate resistors provided for voltage dividing between output terminals of the DC step-up circuit 16, numeral 23 designates a variable resistor provided between the resistors 21, 22, and numeral 24 designates a sensing resistor provided on one connection line connecting the DC step-up circuit 16 and the high-frequency step-up circuit 17.

The control circuit 20 generates a pulse signal of duty cycle in response to output voltage of the DC step-up circuit 16 detected through the resistors 21, 22 and the variable resistor 23 and voltage from the sensing resistor 24. Then the pulse signal is sent to the DC step-up circuit 16, and the output voltage of the DC step-up circuit 16 is controlled.

Next, the operation will be described. When the lighting switch 15 is turned on, a starting pulse is generated by a signal sent from the igniter starting circuit 19 to the current limiting load and igniter circuit 18. The starting pulse is applied between the first and second electrodes 9a, 9b of the discharge lamp 9. The step-up control of the battery voltage is carried out at any time by the control circuit 20, and finally the transfer to the steady state of the lamp is accomplished.

Figure 3:
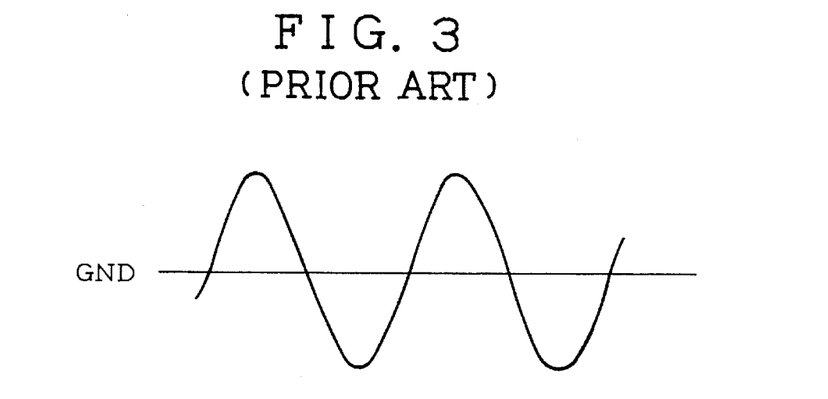
FIG. 3 is a waveform chart of applied voltage to a discharge lamp in a conventional device.

Since the lighting device of high pressure lamp for vehicles in the prior art is constituted as above described, for example, when the high-frequency step-up circuit 17 is a pushpull inverter, it follows that the discharge lamp 9 is lit in plus or minus potential as shown in FIG. 3.

When the discharge lamp 9 is lit, metal atoms filled into the light emitting tube of the discharge lamp 9 are ionized into ions with plus charge. When the surrounding of the light emitting tube is at lower potential than that by the plus charge, the metal ions are drawn toward quartz ($SiO_2$) of the light emitting tube. Most of various metal ions are obstructed by the barrier of the quartz glass. However, since only the sodium ion ($Na^+$) is liable to react with quartz, the sodium ion penetrates into the quartz glass and finally passes through it. This is a phenomenon known as so-called Na loss.

Consequently, when the surrounding of the discharge lamp 9 is at lower potential than the mean lighting potential, due to the Na loss as above described, sodium spectrum (589 nm) is gradually decreased from light spectrum emitted by the discharge lamp. Therefore the red color becomes pale from the color of the emitted light. The metal halide lamp originally has the excellent color rendering and the chromaticity. However, a problem exists in that these properties are significantly deteriorated due to the Na loss and life of the discharge lamp 9 becomes short extremely.

Particularly, when a lighting tool and its periphery are connected to ground as in a lighting device of high pressure lamp for vehicles, probability for the above-mentioned problem to occur is very high. Nevertheless, such problem has never been considered.

This problem occurs not only in the case of using the high-frequency step-up circuit 17 by a pushpull inverter but also in the case of using the high-frequency step-up circuit 17 by a half bridge, a full bridge or the like.

SUMMARY OF THE INVENTION

In order to eliminate the above-mentioned problems, an object of the present invention is to provide a lighting device of discharge lamp for a vehicle where deterioration of life of the discharge lamp due to the Na loss phenomenon can be suppressed.

Another object of the present invention is to improve efficiency of eliminating the Na loss phenomenon and to improve the safety.

In order to attain the foregoing objects, in a lighting device of discharge lamp for vehicles according to the present invention, the mean lighting potential of the discharge lamp is made lower than a potential of a lighting tool to accommodate the discharge lamp. For example, an inverter circuit is provided at the output end of a polarity inversion step-up circuit where voltage of a battery is inverted in the polarity and is stepped up, and the output end of inverter circuit is connected to the discharge lamp and the electrode potential within the discharge lamp is made lower than that of the lighting tool being grounded or the periphery of the lighting tool. Or the output end of the DC step-up circuit for stepping-up the voltage of the battery is connected to the lighting tool or the periphery of the lighting tool, thereby the electrode potential within the discharge lamp is made lower than potential of the lighting tool or the periphery of the lighting tool.

DETAILED DESCRIPTION OF THE PREFERRED EMBODIMENTS

Figure 4:
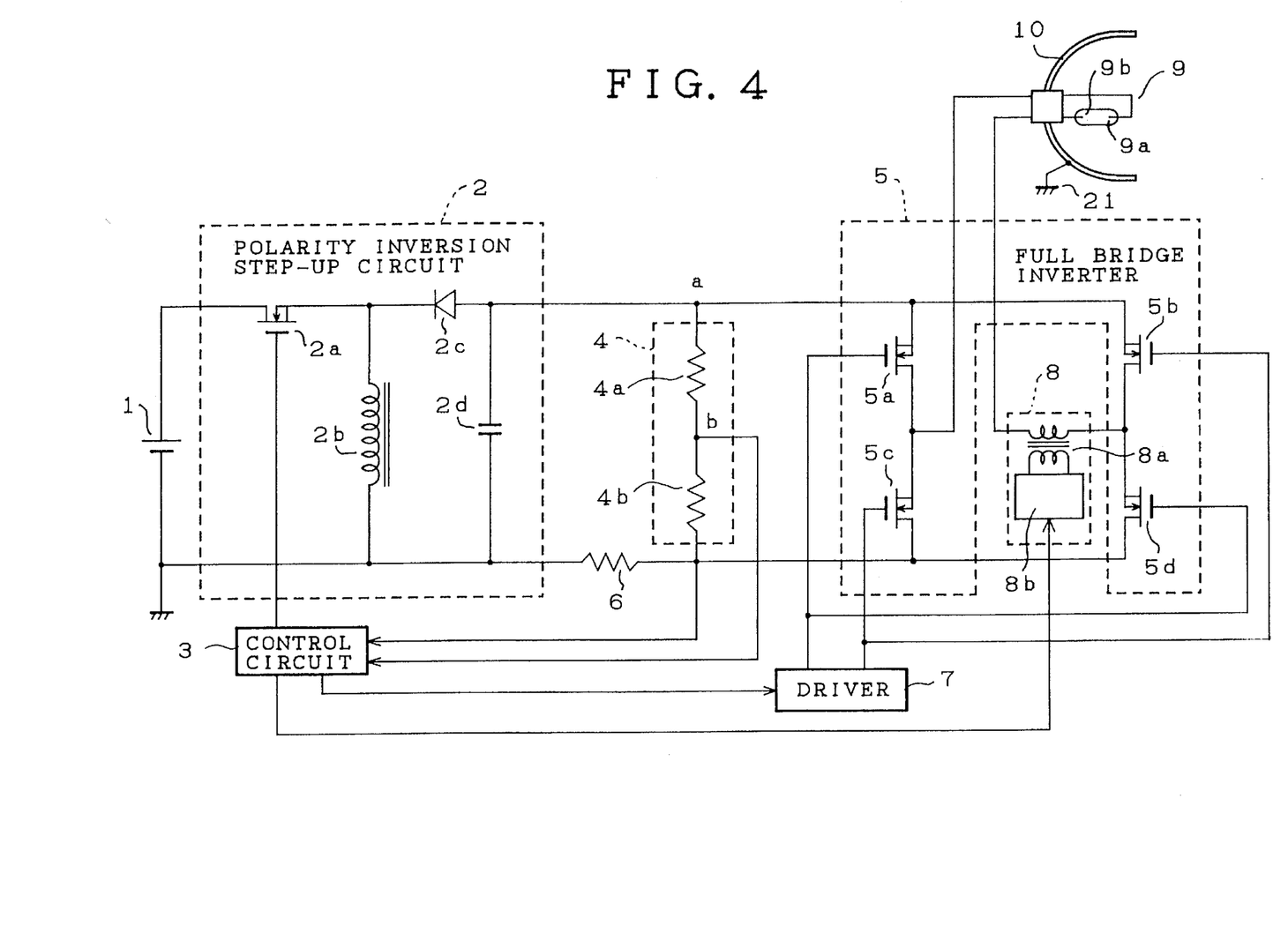
FIG. 4 is a circuit diagram of a lighting device of discharge lamp for a vehicle according to the first embodiment of the invention.

The first embodiment of the present invention will be described referring to FIG. 4 as follows. In FIG. 4, numeral 1 designates a battery, and numeral 2 designates a polarity inversion step-up circuit (hereinafter referred to as "inversion step-up circuit") constituted by a switching element 2a, a coil 2b, a diode 2c and a capacitor 2d. A control circuit 3 is provided with three output terminals and two input terminals. An FET is exemplified as the switching element 2a.

The drain terminal of the switching element 2a being an input terminal of the inversion step-up circuit 2 is connected to the battery 1. The source terminal of the switching element 2a is connected to the cathode terminal of the diode 2c and one terminal of the coil 2b. Also the gate terminal of the switching element 2a is connected to the first output terminal of the control circuit 3. The anode terminal of the diode 2c becomes output of the inversion step-up circuit 2, and is connected to one terminal of the capacitor 2d. The other terminal of the capacitor 2d together with the other terminal of the coil 2b is connected to the ground terminal of the battery 1.

A full bridge inverter 5 is constituted by switching elements 5a–5d, and source terminals of the switching elements 5a and 5b are connected to the output terminal of the inversion step-up circuit 2. The drain terminals of the switching elements 5a and 5b are connected to source electrodes of the switching elements 5c and 5d respectively.

Numeral 6 designates a current detecting resistor, and one terminal of the resistor 6 is connected to drain terminals of the switching elements 5c and 5d and also connected to the second input terminal of the control circuit 3. The other terminal of the resistor 6 is grounded.

A driver 7 turns on or off the switching elements 5a–5d to constitute the full bridge inverter 5, and has two output terminals and one input terminal. The first output terminal of the driver 7 is connected to gate terminals of the switching elements 5a and 5d, and the second output terminal is connected to gate terminals of the switching elements 5b and 5c. From these output terminals is outputted each signal provided with period (margin period) where the switching elements 5a, 5d and the switching elements 5b, 5c are not turned on simultaneously at the same frequency and the opposite phases. Also the input terminal of the driver 7 is connected to the second output terminal of the control circuit 3.

A starting discharge circuit 8 comprises a transformer 8a and a high voltage pulse generator 8b. The primary terminal of the transformer 8a is connected to the high voltage pulse generator 8b. One terminal at the secondary side of the transformer 8a is connected to drain terminal of the switching element 5b, and the other terminal is connected to one terminal of a discharge lamp 9. The other terminal of the discharge lamp 9 is connected to drain terminal of the switching element 5a. Also the high voltage pulse generator 8b is connected to the third output terminal of the control circuit 3.

The discharge lamp 9 is provided with the first electrode 9a and the second electrode 9b within the light emitting tube. A lighting tool 10 enclosing the discharge lamp 9 is grounded by a grounding connection wire 21.

Operation will be described as follows. In FIG. 4, if a lighting switch (not shown) is turned on, voltage of the battery 1 is inputted to the inversion step-up circuit 2, and at the same time, the control circuit 3 starts the operation. The control circuit 3 outputs a pulse signal with the frequency f and duty variable from the first output terminal to the switching element 2a, and also sends a signal from the second output terminal to the driver 7. Using this signal, the driver 7 turns the switching elements 5a, 5d on.

During the ON-period of the switching element 2a, a loop of the battery 1, the switching element 2a, the coil 2b is formed, and the electromagnetic energy is stored in the coil 2b by a current flowing in this loop.

During the OFF-period of the switching element 2a, a loop of the coil 2b, the diode 2c, the capacitor 2d is formed. Therefore the electromagnetic energy stored in the coil 2b during the ON-period is discharged through the diode 2c into the capacitor 2d. That is, the electromagnetic energy is converted into the electrostatic energy and is stored in the capacitor 2d. Consequently, the minus voltage appears at the terminal a point. In this case, the minus voltage is made Va.

Since the switching element 2a repeats the ON/OFF operations at the frequency f, the absolute value of the voltage Va at the terminal a point rises gradually. However, the sign of Va is minus. The voltage Va is divided by the resistors 4a, 4b in the voltage dividing resistor 4, and is detected at the b point being the joint of these resistors. The detected voltage is inputted to the first input terminal of the control circuit 3. Based on the voltage inputted from the first input terminal, the control circuit 3 supervises whether the voltage Va attains to the prescribed value, for example, −400 V or not. When the voltage Va attains to the prescribed value, the pulse signal (frequency f) of duty ratio to hold the prescribed value is continued to be outputted to the gate terminal of the switching element 2a. Therefore, the output of the inversion step-up circuit 2 is held Lo a prescribed value.

Since the switching elements 5a, 5d are turned on then, the voltage Va is applied across the discharge lamp 9. That is, the first electrode 9a of the discharge lamp 9 is at the voltage Va and the second electrode 9b is at the ground potential.

The control circuit 3 sends a starting signal from the third output terminal to the high voltage pulse generator 8b, after the $t_1$ time from the voltage Va attaining to the prescribed value. On receiving the starting signal, the high voltage pulse generator 8b applies high voltage pulse to the discharge lamp 9 through the transformer 8a.

The high voltage pulse is applied to the discharge lamp 9, thereby insulation breakdown occurs between the first electrode 9a and the second electrode 9b and the discharge lamp 9 starts the starting discharge. Consequently a current flows through the discharge lamp 9. Thereby the voltage of the first electrode 9a of the discharge lamp 9, i.e., the voltage Va rises rapidly from the prescribed value, and the voltage of the second electrode 9b becomes voltage being the current flowing through the discharge lamp 9 multiplied by value of the current detecting resistor 6.

Range of the current flowing through the discharge lamp 9 is several hundred mA—about 3A. The current detecting resistance value is set to about 1 Ω. Therefore the voltage of the second electrode 9b has value ranging from—several hundred mV to several V with respect to the ground potential. Consequently the voltage Va may be considered as nearly the voltage across the discharge lamp 9.

Figure 5:
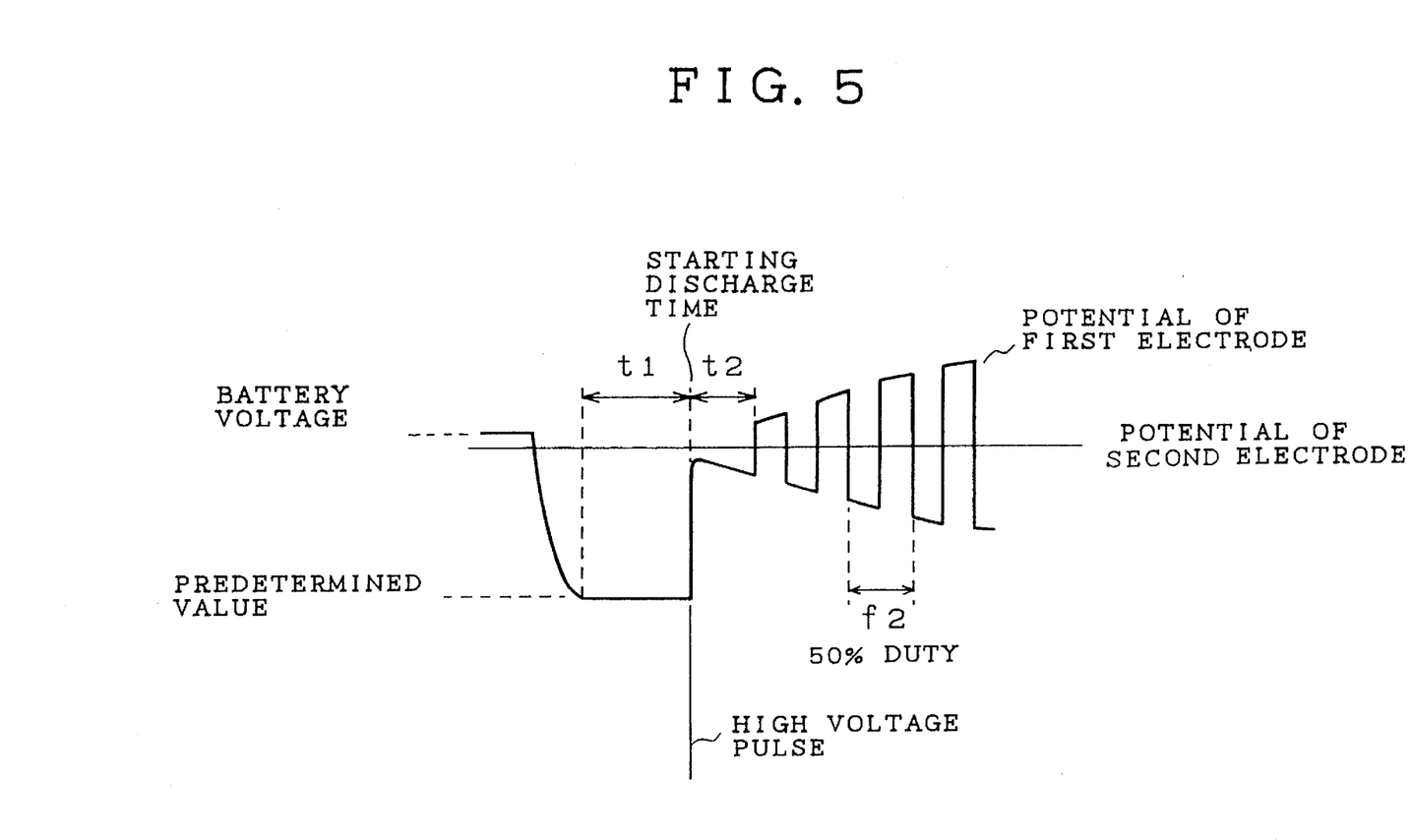
FIG. 5 is a waveform chart in the lighting device shown in FIG. 4 at the starting discharge state.

FIG. 5 shows variation of the voltage of the first electrode 9a with respect to the second electrode 9b at the starting discharge state. The variation of the voltage Va is detected by the voltage detecting resistor 4 and is sent to the control circuit 3. By rapid rise of the voltage Va, the control circuit 3 detects success of the starting discharge. For the time $t_2$ from the detection time, the control circuit 3 continues to turn the switching elements 5a, 5d on similarly to the starting discharge time. Therefore since the DC voltage is applied to the discharge lamp 9, the discharge state of the discharge lamp 9 is stabilized.

And then the control circuit 3 sends a signal of the frequency $f_2$ and about 50% duty from the second output terminal to the driver 7. The driver 7 adds the margin period of about several μ sec to this signal, and sends a signal which carries out the ON/OFF operations of the switching elements 5b, 5c and the switching elements 5a, 5d alternately.

Figure 6:
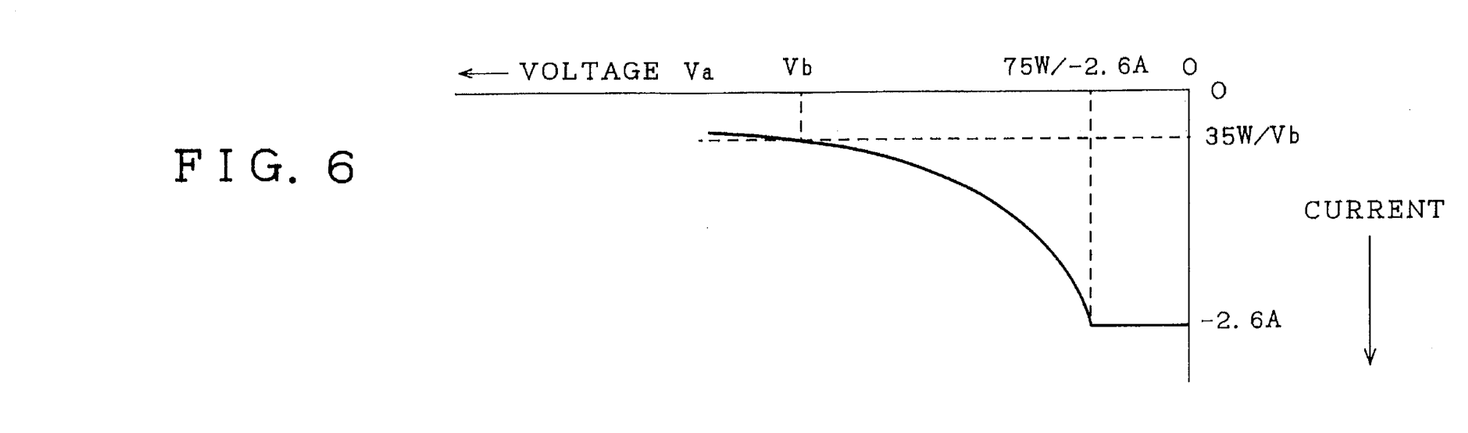
FIG. 6 is a waveform chart showing control pattern in the lighting device shown in FIG. 4.

Thus although there is loss at the switching state by the switching elements 5a–5d, the discharge lamp 9 has the square wave AC voltage applied with voltage magnitude value being about |Va|. The control circuit 3 determines the current value to flow through the discharge lamp 9, from the voltage Va detected by the voltage detecting resistor 4, according to the predetermined voltage-current pattern as shown in FIG. 6. In response to the determined current ratio, the duty ratio for the ON/OFF operation of the switching element 2a is varied. By this feedback control, the discharge lamp 9 is rapidly transferred to the stable lighting state.

In addition, the predetermined voltage-current pattern satisfies the rating of the discharge lamp for vehicles, for example, maximum current 2.6 A, maximum power 75 W, stable lighting power 35 W. Also the voltage Vb shown in FIG. 6 is voltage of the discharge lamp 9 at the stable lighting state.

Figure 7:
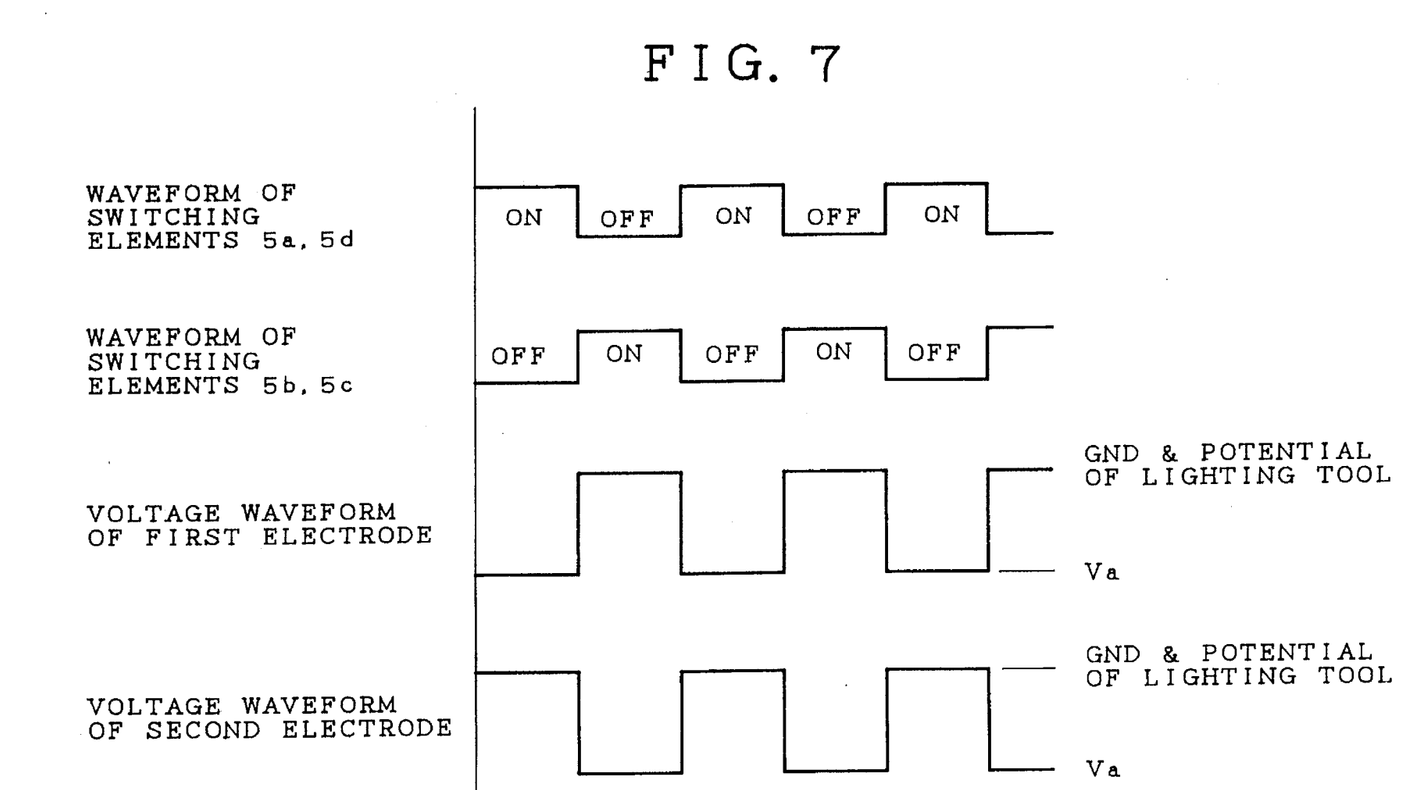
FIG. 7 is a signal waveform chart in each part of a circuit in the lighting device shown in FIG. 4.

FIG. 7 shows potential of each electrode of the discharge lamp 9 with respect to the ground potential. First, when the switching elements 5a, 5d are turned on and the switching elements 5b, 5c are turned off, the voltage of the first electrode 9a of the discharge lamp 9 is the voltage Va (sign is minus). When the switching elements 5a, 5d are turned off and the switching elements 5b, 5c are turned on, the voltage of the first electrode 9a is nearly the ground potential although there is the voltage drop due to the current detecting resistor 6.

On the other hand, the voltage applied to the second electrode is nearly the ground potential, when the switching elements 5a, 5d are turned on and the switching elements 5b, 5c are turned off. The voltage of the second electrode becomes the voltage Va (sign is minus), when the switching elements 5a, 5d are turned off and the switching elements 5b, 5c are turned on. The potential of the lighting tool 10 enclosing the discharge lamp 9 is the ground potential. Both the first electrode 9a and the second electrode 9b of the discharge lamp 9 become the ground potential or less, thereby it follows that the discharge lamp 9 is lit always at the mean lighting potential less than the potential of the lighting tool 10. That is, since the surrounding potential of the discharge lamp 9 becomes higher than the mean lighting potential, the Na loss phenomenon can be suppressed. Accordingly, the life of the discharge lamp 9 is lengthened in simple change of the circuit constitution that the polarity inversion step-up circuit 2 is provided in place of the conventional DC step-up circuit 16.

Figure 8:
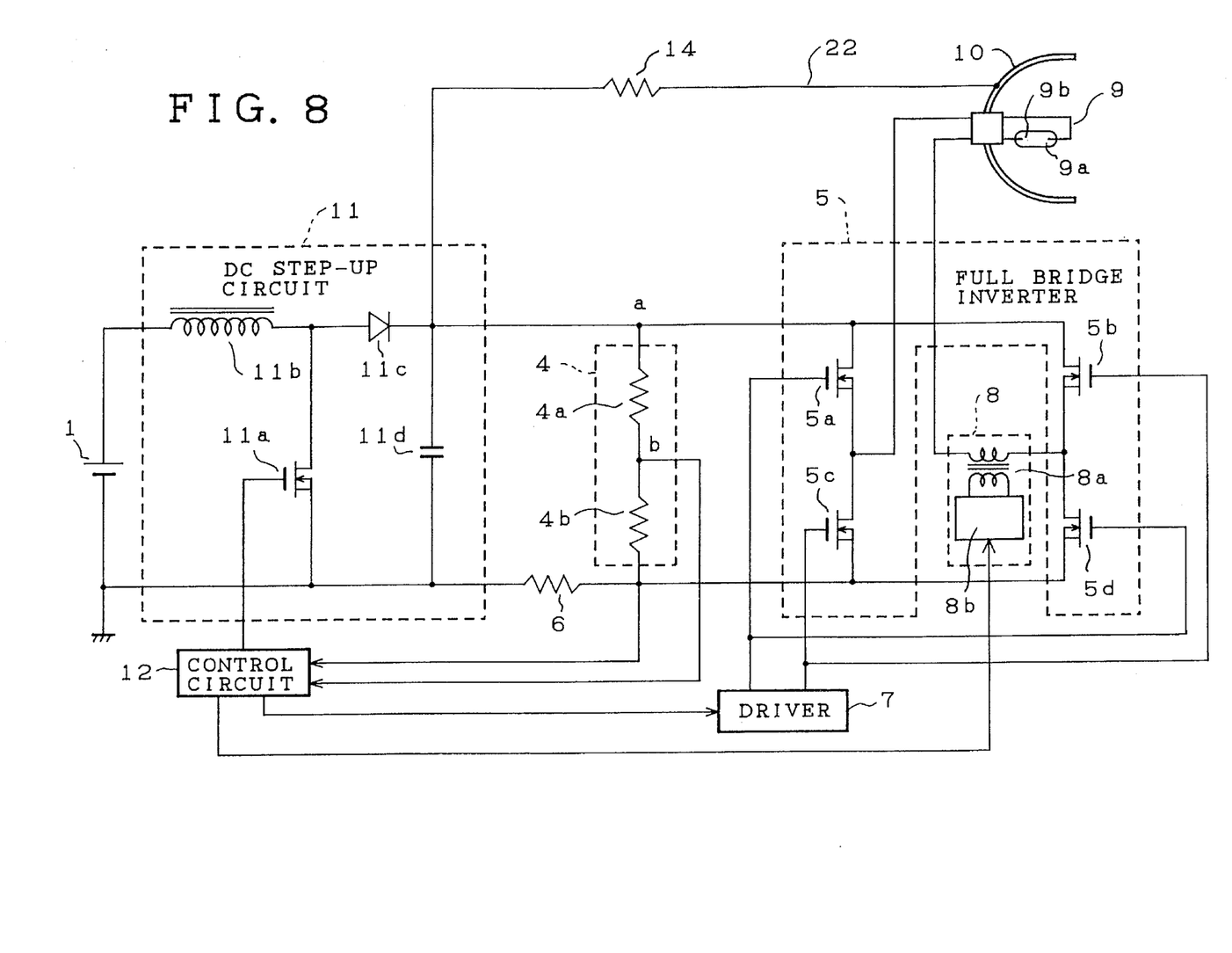
FIG. 8 is a circuit diagram of a lighting device of discharge lamp for a vehicle according to the second embodiment of the invention.

The second embodiment of the present invention will be described referring to FIG. 8 as follows. In FIG. 8, numeral 1 designates a battery, and numeral 11 designates a DC step-up circuit constituted by a switching element 11a, a coil 11b, a diode 11c and a capacitor 11d. A control circuit 12 is provided with three output terminals and two input terminals.

One terminal of the coil 11b being an input terminal of the step-up circuit 11 is connected to the battery 1. The drain terminal of the switching element 11a and the anode terminal of the diode 11c are connected to the other terminal of the coil 11b. The gate terminal of the switching element 11a is connected to the first output terminal of the control circuit 12. The cathode terminal of the diode 11c becomes output of the DC step-up circuit 11, and is connected to one terminal of the capacitor 11d. The other terminal of the capacitor 11d together with source terminal of the switching element 11a is connected the ground terminal of the battery 1.

Numeral 4 designates a voltage detecting resistor constituted by resistors 4a and 4b, and one terminal of the resistor 4a is connected to an output terminal of the step-up circuit 11. The other terminal of the resistor 4a is connected to one terminal of the resistor 4b and also inputted to the first input terminal of the control circuit 12. The other terminal of the resistor 4b is grounded.

A full bridge inverter 5 is constituted by switching elements 5a–5d. Numeral 6 designates a current detecting resistor, and one terminal of the resistor 6 is connected to source terminals of the switching elements 5c and 5d and also inputted to the second input terminal of the control circuit 12 and the other terminal is grounded. A driver 7 turns on or off the switching elements 5a–5d to constitute the full bridge inverter 5.

From each output terminal of the driver 7 is outputted a signal provided with period, so-called dead time where the switching elements 5a, 5d and the switching elements 5b, 5c are not turned on simultaneously at the same frequency and the opposite phases. Also the input terminal of the driver 7 is connected to the second output terminal of the control circuit 12. A starting discharge circuit 8 comprises a transformer 8a and a high voltage pulse generator 8b.

The discharge lamp 9 is provided with the first electrode 9a and the second electrode 9b within the light emitting tube, and is enclosed in a lighting tool 10. Numeral 14 designates a resistor as a current limiting element of about several MΩ. Here, the lighting tool 10 is connected through the resistor 14 to the output end at plus side of the DC step-up circuit 11 by a connection wire 22.

Operation will be described as follows. In FIG. 8, if a lighting switch (not shown) is turned on, voltage of the battery 1 is inputted to the step-up circuit 11, and at the same time, the control circuit 12 starts the operation. The control circuit 12 outputs a pulse signal with the frequency f and duty variable from the first output terminal to the switching element 11a, and also sends a signal from the second output terminal to the driver 7. Using this signal, the driver 7 turns the switching elements 5a, 5d on.

During the ON-period of the switching element 11a, a loop of the battery 1, the switching element 11a, the coil 11b is formed, and a current flows through the coil 11b in this loop, and the electromagnetic energy is stored in the coil 11b.

During the OFF-period of the switching element 11a, a loop of the battery 1, the coil 11b, the diode 11c, the capacitor 11d is formed, and the electromagnetic energy stored in the coil 11b during the ON-period is discharged through the diode 11c into the capacitor 11d. That is, the electromagnetic energy is converted into the electrostatic energy and is stored in the capacitor 11d. Consequently, the voltage corresponding to the capacitor voltage is superposed to the voltage of the battery 1 and appears at the a point.

Since the ON/OFF operation is repeated at the frequency f, the voltage at the a point rises gradually. If the voltage produced at the a point is made Va, the voltage Va is divided by the resistors 4a, 4b in the voltage dividing resistor 4. Voltage at the b point being the joint of the resistors 4a, 4b is inputted to the first input terminal of the control circuit 12.

if the control circuit 12 detects that the voltage Va attains to the prescribed value, for example, 400 V, the pulse signal (frequency f) of duty ratio to hold the prescribed value is continued to be outputted from the first output terminal to the switching element 11a. Therefore, the output voltage of the DC step-up circuit 11 is held to a prescribed value.

Since the switching elements 11a, 11d are turned on then, nearly the voltage Va is applied across the discharge lamp 9, although there is loss of the switching elements at the switching state. That is, the first electrode 9a of the discharge lamp 9 is at the voltage Va and the second electrode 9b is at the ground potential. Also since the output end of the DC step-up circuit 11 is connected through the resistor 14 to the lighting tool 10, even if the lighting tool 10 is not earthed, there is no fear of electric shock.

The control circuit 12 sends a starting signal from the third output terminal to the high voltage pulse generator 8b, after the $t_1$ time from the voltage Va attaining to the prescribed value. On receiving the starting signal, the high voltage pulse generator 8b applies high voltage pulse to the discharge lamp 9 through the transformer 8a. The high voltage pulse is applied to the discharge lamp 9, thereby insulation breakdown occurs between the first electrode 9a and the second electrode 9b and the discharge lamp 9 starts the starting discharge. Consequently a current flows through the discharge lamp 9.

Thereby the voltage Va of the first electrode 9a of the discharge lamp 9 falls rapidly from the prescribed value, and the voltage of the second electrode 9b becomes voltage being the current flowing through the discharge lamp 9 multiplied by value of the current detecting resistor 6.

Range of the current flowing through the discharge lamp 9 is several hundred mA—about 3A. The current detecting resistance value is set to about 1 Ω. Therefore the voltage of the second electrode 9b has value ranging from several hundred mV to several V with respect to the ground potential. Consequently the voltage Va may be considered as nearly the voltage across the discharge lamp 9.

Figure 9:
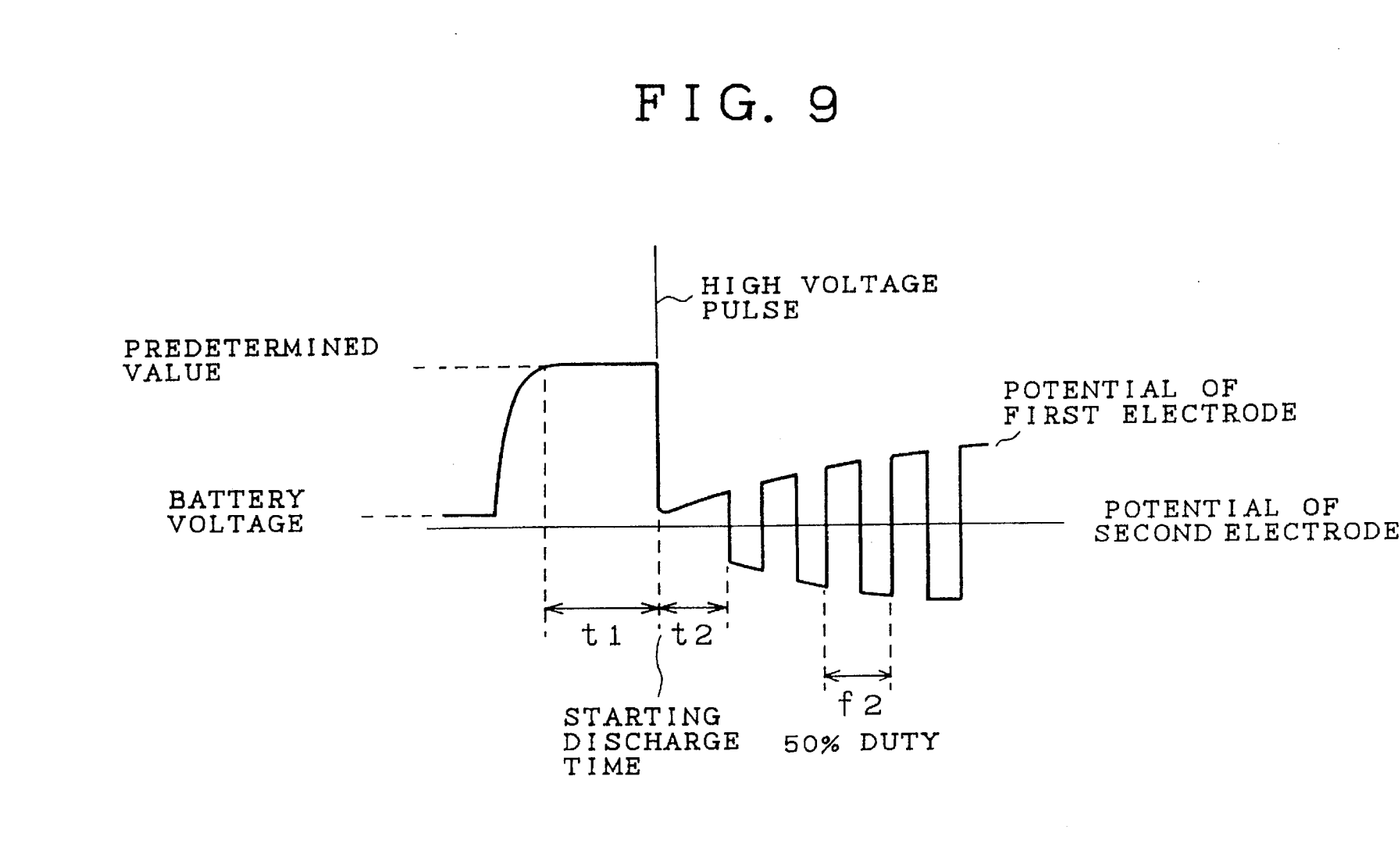
FIG. 9 is a waveform chart in the lighting device shown in FIG. 8 at the starting discharge state.

FIG. 9 shows variation of the voltage across the discharge lamp 9 at the starting discharge state. The variation of the voltage Va is detected by the voltage detecting resistor 4 and is sent to the control circuit 12. By rapid rise of the voltage Va, the control circuit 12 detects success of the starting discharge. For the time $t_2$ from the detection time, the control circuit 12 continues to turn the switching elements 5a, 5d on similarly to the starting discharge time. Therefore since the DC voltage is applied to the discharge lamp 9, the discharge state of the discharge lamp 9 is stabilized.

And then the control circuit 12 sends a signal of the frequency $f_2$ and about 50% duty from the second output terminal to the driver 7. The driver 7 adds the margin period of about several μ sec to this signal, and sends a signal which carries out the ON/OFF operations of the switching elements 5b, 5c and the switching elements 5a, 5d alternately.

Figure 10:
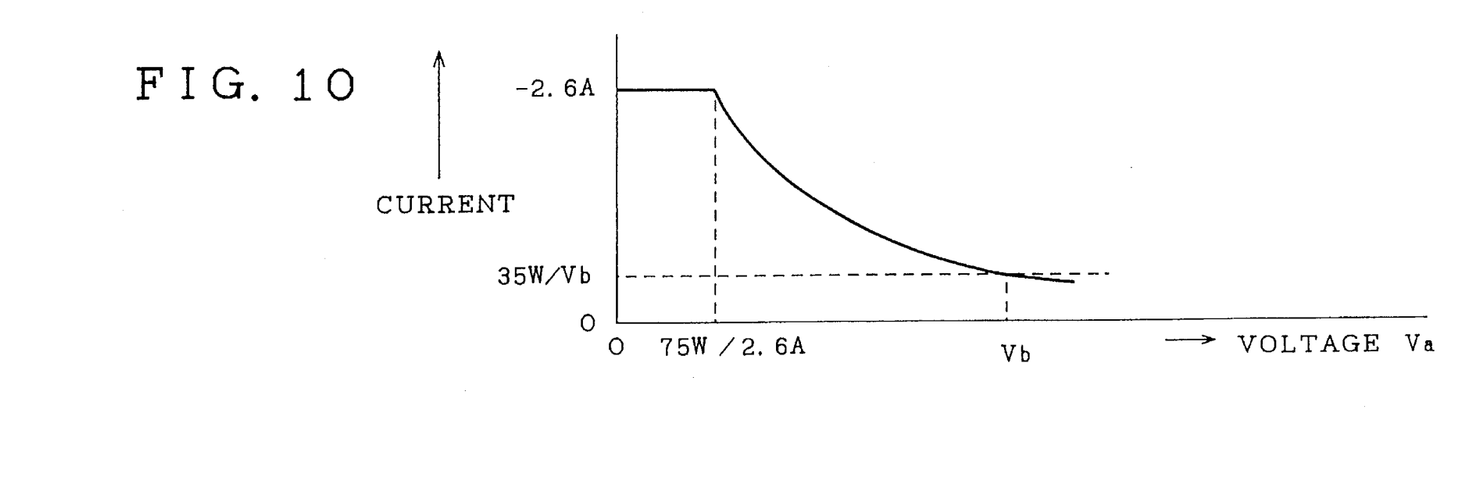
FIG. 10 is a waveform chart showing control pattern in the lighting device shown in FIG. 8.

Thus although there is loss at the switching state by the switching elements 5a–5d, the discharge lamp 9 is applied by the square wave AC voltage with voltage value between zero and peak being about |Va|. The control circuit 12 determines the current value to flow through the discharge lamp 9, from the voltage Va detected by the voltage detecting resistor 4, according to the predetermined voltage-current pattern as shown in FIG. 10. In response to the determined current ratio, the duty ratio for the ON/OFF operation of the switching element 11a is varied. By this feedback control, the discharge lamp 9 is rapidly transferred to the stable lighting state.

In addition, the predetermined voltage-current pattern satisfies the rating of the discharge lamp for vehicles, for example, maximum current 2.6 A, maximum power 75 W, stable lighting power 35 W. Also the voltage Vb shown in FIG. 9 is voltage of the discharge lamp 9 at the stable lighting state.

Figure 11:
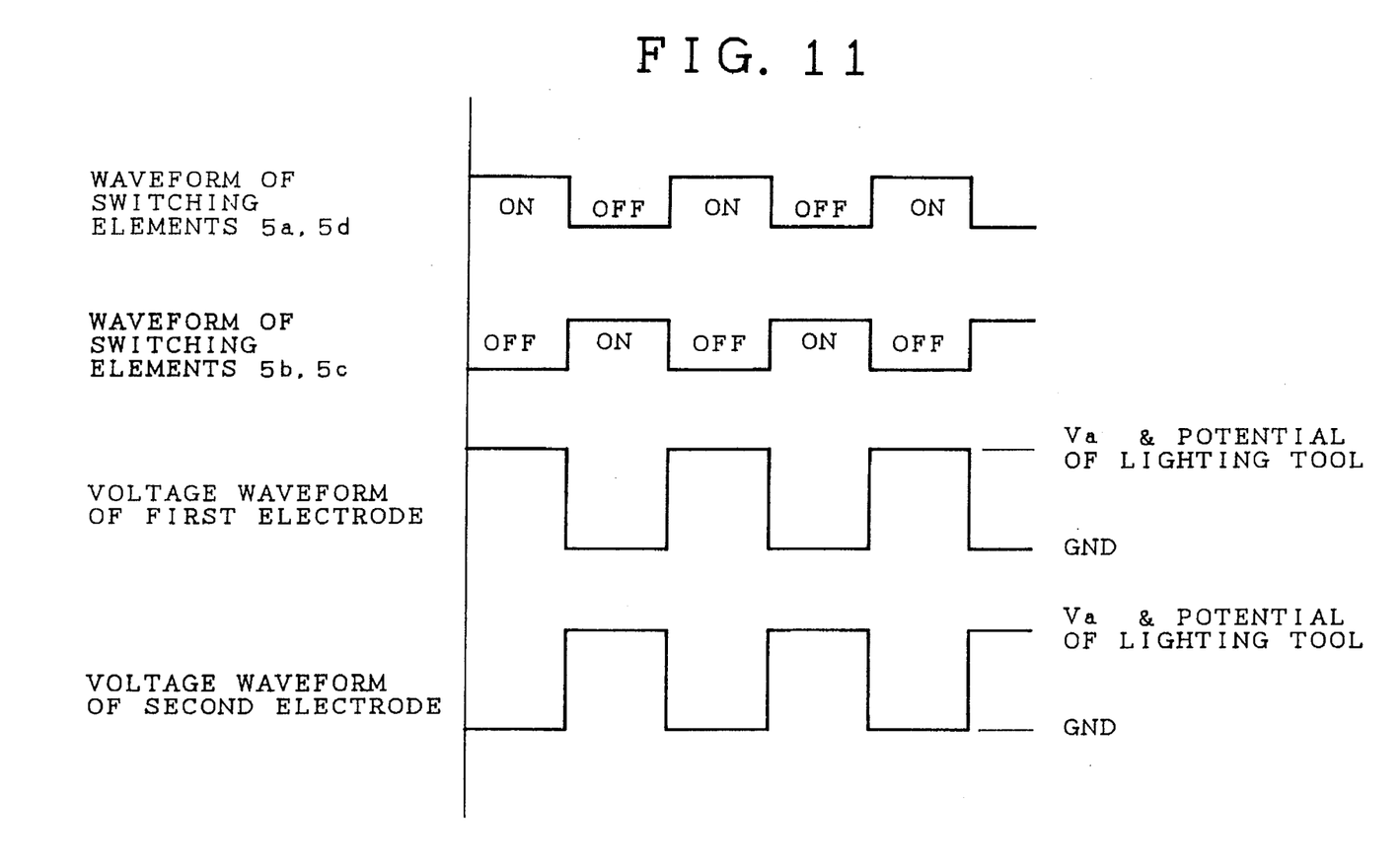
FIG. 11 is a signal waveform chart in each part of a circuit in the lighting device shown in FIG. 8.

FIG. 11 shows potential of each electrode of the discharge lamp 9 with respect to the ground potential. First, when the switching elements 5a, 5d are turned on and the switching elements 5b, 5c are turned off, the voltage of the first electrode 9a of the discharge lamp 9 is the voltage Va. When the switching elements 5a, 5d are turned off and the switching elements 5b, 5c are turned on, the voltage of the first electrode 9a is nearly the ground potential although there is the voltage drop due to the current detecting resistor 6.

On the other hand, the voltage applied to the second electrode is nearly the ground potential, when the switching elements 5a, 5d are turned on and the switching elements 5b, 5c are turned off. The voltage of the second electrode becomes the voltage Va, when the switching elements 5a, 5d are turned off and the switching elements 5b, 5c are turned on. Since the lighting tool 10 enclosing the discharge lamp 9 is connected to the output of the DC step-up circuit 11, its potential is Va. Both the first electrode 9a and the second electrode 9b of the discharge lamp 9 become the voltage Va or less, thereby it follows that the discharge lamp 9 is lit always at the mean lighting potential less than the potential of the lighting tool 10.

In this case, since the output of the battery 1 is stepped up without the polarity inversion, the Na loss phenomenon can be eliminated efficiently. Also since the lighting tool 10 is connected through the current limiting element to the output end of the DC step-up circuit 11, even if the lighting tool is not earthed, there is no fear of electric shock.

What is claimed is:

1. A lighting device of a discharge lamp for vehicles, comprising:
   step-up means for enlarging an absolute value of an input DC voltage and outputting a DC voltage;
   voltage conversion means for inputting the DC voltage from said step-up means and converting the DC voltage into an AC voltage to light the discharge lamp with an AC lighting potential and supplying the AC lighting potential to the discharge lamp which is enclosed in a lighting tool;
   starting discharge means for generating a high voltage pulse to start said discharge lamp, and
   potential setting means for setting a potential of the lighting tool to a prescribed value, wherein said step-up means outputs the input DC voltage so that a mean lighting potential of the discharge lamp becomes less than said prescribed value.

2. A lighting device as set forth in claim 1, wherein the step-up means comprises a polarity inversion step-up circuit for outputting DC voltage with a negative polarity.

3. A lighting device as set forth in claim 2, wherein the potential setting means comprises a grounding connection wire for grounding said lighting tool.

4. A lighting device as set forth in claim 1, wherein said step-up means comprises a step-up circuit for outputting DC voltage with a positive polarity, and said potential setting means comprises a connection wire for connecting the lighting tool to an output terminal at a positive side of said step-up circuit.

5. A lighting device as set forth in claim 4, wherein a current limiting element is inserted in said connection wire.

6. A method of operating a lamp including a light source and a housing surrounding the light source, the method comprising:
   (a) applying a large voltage across the light source to induce a dielectric breakdown;
   (b) detecting the dielectric breakdown induced in step (a);
   (c) applying an alternating voltage across the light source after detecting the dielectric breakdown in step (b); and
   (d) applying a base potential to the housing surrounding the light source, the base potential being higher than the average potential applied to the light source.

7. The method of claim 6, wherein step (a) includes
   (a1) creating a stepped-up DC voltage;
   (a2) superimposing a high voltage pulse on the stepped-up DC voltage creating the large voltage; and
   (a3) applying the resulting large voltage across the light source.

8. The method of claim 6, wherein step (c) includes
   (c1) creating a DC voltage;
   (c2) applying the DC voltage through a switching circuit to the light source;
   (c3) repeatedly switching the polarity of the DC voltage applied to said light source to thereby apply the alternating voltage across the light source.

9. The method of claim 8, wherein step (c1) includes
   creating a DC voltage ranging from a first negative potential to a ground potential; and wherein step (d) includes
   (d1) applying the ground potential as the base potential to the housing.

10. The method of claim 8, wherein step (c1) includes
    creating a DC voltage ranging from a ground potential to a first positive potential; and wherein step (d) includes
    (d1) applying the first positive potential to the housing.

11. The method of claim 9, wherein step (a) includes
    (a1) superimposing a high pulse voltage on the DC voltage to create the large voltage; and
    (a2) applying the large voltage across the light source to induce a dielectric breakdown.

12. The method of claim 10, wherein step (a) includes
    (a1) superimposing a high pulse voltage on the DC voltage to create the large voltage; and
    (a2) applying the large voltage across the light source to induce a dielectric breakdown.

13. The method of claim 11, wherein
    step (c1) includes creating a DC voltage using a polarity inversion step-up circuit; and
    step (c3) includes repeatedly switching the polarity of the DC voltage applied across the light source by utilizing a full bridge inverter.

14. The method of claim 12, wherein
    step (c1) includes creating a DC voltage using a DC step-up circuit; and
    step (c3) includes repeatedly switching the polarity of the DC voltage applied across the light source by utilizing a full bridge inverter.

15. The method of claim 13, wherein steps (a) and (c) include applying a voltage to metal halide lamp.

16. The method of claim 14, wherein steps (a) and (c) include applying a voltage to a metal halide lamp.

17. A vehicle including a high intensity lamp having:
    a light source including two electrodes;
    a housing, housing said light source;
    a base potential source, applying a base potential to said housing; and
    an alternating voltage source, applying an alternating voltage across said light source through said two electrodes, said alternating voltage having a mean potential less than said base potential.

18. The vehicle of claim 17, wherein said alternating voltage source has:
    a DC voltage source; and a switching circuit, switching the polarity of said DC voltage source applied across said light source through said two electrodes.

19. The circuit of claim 1, further comprising a control circuit for controlling said step-up circuit and said voltage conversion circuit according to the current flowing through said discharge lamp to stabilize the discharge lamp voltage.

20. The method of claim 6, further comprising the step of controlling said applied alternating voltage according to the current flowing through said discharge lamp to stabilize the discharge lamp voltage.

21. A method of reducing metal ion loss in a gas-discharge lamp having a housing, comprising the steps of:

(a) applying a housing potential to the housing;

(b) supplying a DC voltage;

(c) converting said DC voltage to an AC voltage; and (d) applying said AC voltage across the gas-discharge lamp, wherein an average value of the AC voltage applied to said gas-discharge lamp is less than said housing potential to prevent an attraction of metal ions to the housing to reduce metal ion loss.

22. The method according to claim 21 wherein said applied housing potential is a ground potential.

23. The method according to claim 21, wherein said applied housing potential has a positive polarity.

24. The method of claim 21 wherein the metal ion loss is sodium ion loss.

* * * * *